United States Patent
Taunay (10) Patent No.: US 9,366,810 B2
(45) Date of Patent: *Jun. 14, 2016

(54) DOUBLE-CLAD, GAIN-PRODUCING FIBERS WITH INCREASED CLADDING ABSOROPTION WHILE MAINTAINING SINGLE-MODE OPERATION

(71) Applicant: OFS Fitel, LLC, Norcross, GA (US)

(72) Inventor: Thierry F. Taunay, Bridgewater, NJ (US)

(73) Assignee: OFS FITEL, LLC, Norcross, GA (US)

( * ) Notice: Subject to any disclaimer, the term of this patent is extended or adjusted under 35 U.S.C. 154(b) by 284 days.

This patent is subject to a terminal disclaimer.

(21) Appl. No.: 14/010,791

(22) Filed: Aug. 27, 2013

(65) Prior Publication Data

US 2014/0212103 A1 Jul. 31, 2014

Related U.S. Application Data

(60) Provisional application No. 61/694,709, filed on Aug. 29, 2012.

(51) Int. Cl.
| | |
|---|---|
| G02B 6/036 | (2006.01) |
| G02B 6/02 | (2006.01) |
| H01S 3/067 | (2006.01) |
| B29D 11/00 | (2006.01) |
| H01S 3/16 | (2006.01) |

(52) U.S. Cl.
CPC ...... *G02B 6/02338* (2013.01); *B29D 11/00682* (2013.01); *G02B 6/02004* (2013.01); *G02B 6/036* (2013.01); *H01S 3/06704* (2013.01); *C03B 2201/36* (2013.01); *C03B 2203/23* (2013.01); *G02B 6/03644* (2013.01); *H01S 3/06733* (2013.01); *H01S 3/06754* (2013.01); *H01S 3/1618* (2013.01)

(58) Field of Classification Search
CPC . G02B 6/02338; G02B 6/02004; G02B 6/036
See application file for complete search history.

(56) References Cited

U.S. PATENT DOCUMENTS

| | | | |
|---|---|---|---|
| 4,852,968 | A | 8/1989 | Reed |
| 5,708,669 | A | 1/1998 | Digiovanni et al. |
| 5,864,644 | A | 1/1999 | Digiovanni et al. |
| 5,907,652 | A | 5/1999 | Digiovanni et al. |
| 5,937,134 | A | 8/1999 | Digiovanni |
| 5,949,941 | A | 9/1999 | Digiovanni |
| 5,966,491 | A | 10/1999 | Digiovanni |
| 6,810,186 | B2 * | 10/2004 | Mukasa ........... H04B 10/25253 385/123 |
| 6,826,335 | B1 | 11/2004 | Grudinin et al. |

(Continued)

FOREIGN PATENT DOCUMENTS

| | | | | |
|---|---|---|---|---|
| EP | 2703853 A1 | * | 3/2014 | ......... G02B 6/03644 |
| EP | 2703854 A1 | * | 3/2014 | ....... B29D 11/00682 |
| WO | 2011118293 A1 | | 9/2011 | |

OTHER PUBLICATIONS

"Photodarkening," 3-pages available from Wikipedia, on Oct. 18, 2012.

*Primary Examiner* — Rhonda Peace
(74) *Attorney, Agent, or Firm* — Michael J. Urbano (57) ABSTRACT

The cladding absorption of single-mode, double-clad, gain-producing fibers is increased in fiber designs that includes a trench region disposed between the core and inner cladding regions. Increased cladding absorption is achieved while maintaining single-mode operation.

17 Claims, 4 Drawing Sheets

(56) References Cited

U.S. PATENT DOCUMENTS

| | | | |
|---|---|---|---|
| 6,895,140 B2 * | 5/2005 | Matsuo | G02B 6/03644 385/23 |
| 6,970,624 B2 | 11/2005 | Digiovanni et al. | |
| 7,085,462 B2 * | 8/2006 | Mukasa | G02B 6/02004 385/123 |
| 7,095,940 B2 | 8/2006 | Hayami et al. | |
| 7,916,386 B2 | 3/2011 | Digiovanni et al. | |
| 8,107,784 B2 | 1/2012 | Borel et al. | |
| 8,428,409 B2 * | 4/2013 | Nicholson | H01S 3/0675 385/123 |
| 8,731,358 B2 * | 5/2014 | Pare | G02B 6/03661 385/126 |
| 9,093,815 B2 * | 7/2015 | Herstrom | H01S 3/0672 |
| 2002/0114600 A1 * | 8/2002 | Aiso | C03C 3/06 385/123 |
| 2003/0228118 A1 | 12/2003 | Arbore | |
| 2006/0088261 A1 | 4/2006 | Berkey et al. | |
| 2009/0123120 A1 | 5/2009 | Dragic | |
| 2009/0169163 A1 | 7/2009 | Abbott et al. | |
| 2011/0081123 A1 | 4/2011 | Pare et al. | |
| 2014/0063594 A1 * | 3/2014 | Herstrom | H01S 3/0672 359/341.5 |
| 2014/0212103 A1 * | 7/2014 | Taunay | B29D 11/00682 385/127 |
| 2015/0260910 A1 * | 9/2015 | Taunay | G02B 6/03644 385/127 |

\* cited by examiner

DOUBLE-CLAD, GAIN-PRODUCING FIBERS WITH INCREASED CLADDING ABSOROPTION WHILE MAINTAINING SINGLE-MODE OPERATION

CROSS-REFERENCE TO RELATED APPLICATIONS

This application claims priority from provisional application Ser. No. 61/694,709 filed on Aug. 29, 2012 and entitled "DOUBLE CLAD, GAIN PRODUCING FIBERS WITH INCREASED CLADDING ABSORPTION WHILE MAINTAINING SINGLE MODE OPERATION." In addition, this application was concurrently filed with application Ser. No. 14/010,825 and entitled "GAIN-PRODUCING FIBERS WITH INCREASED CLADDING ABSORPTION WHILE MAINTAINING SINGLE-MODE OPERATION."

BACKGROUND OF THE INVENTION

1. Field of the Invention

This invention relates to gain-producing fibers (GPFs) that support either a single signal mode or few signal modes and, more particularly, to double-clad GPFs designed for increased cladding absorption of pump light while maintaining operation in a single signal mode.

2. Discussion of the Related Art

Figure 7:
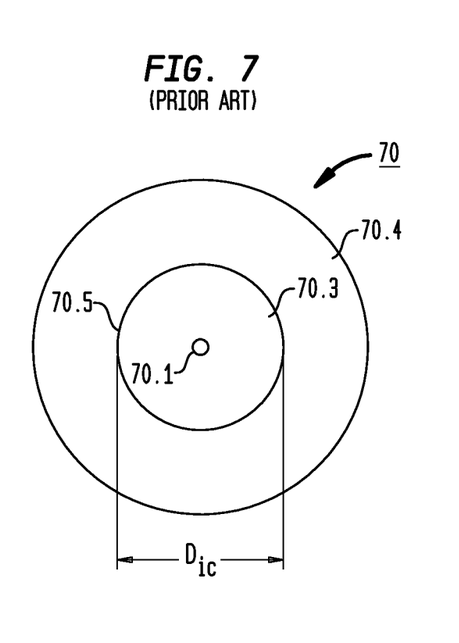
FIG. 7 is a schematic, transverse cross-section of a double-clad GPF in accordance with a conventional (prior art) design.

Single-mode GPFs with a double-clad fiber (DCF) design are commonly used in high power optical fiber lasers and amplifiers requiring good beam quality. FIG. 7 illustrates a well known DCF 70, which comprises a core region 70.1, an inner cladding region 70.3 surrounding the core region, and an outer cladding region 70.4 surrounding the inner cladding region. The waveguide formed by the core and inner cladding regions primarily is configured to support and guide the propagation of signal light in a single mode; that is, preferably in the fundamental ($LP_{01}$) mode.

In order to produce gain when suitably pumped, the core region is doped with gain-producing species, usually one or more rare-earth elements (e.g., Er, Yb, Tm, Nd) or one or more non-rare-earth elements (e.g., Cr, Bi) depending on the wavelength of the signal light to be amplified or the laser light to be generated. Multi-mode pump light coupled (launched) into the core region via (through) the inner cladding region reflects from the interface 70.5 between the inner and outer cladding regions, and as it propagates down the fiber axis, pump light traverses the core region where it is absorbed by particular dopants (i.e., gain-producing species) in the core region. In this fashion, pump light energy amplifies signal light that is simultaneously propagating down (predominantly) the core region of the fiber.

The effectiveness of the amplification process (i.e., the energy transfer from pump light to signal light) is determined, in part, by a parameter ($\alpha_{clad}$) known as cladding absorption (of pump light) given by $$\alpha_{clad} = \alpha_d [A_d / A_{clad}]. \quad (1)$$

where $\alpha_d$ is the material absorption of pump light in the portion of the fiber doped with gain-producing species (hereinafter the gain region; e.g., the core region 70.1 of FIG. 7), $A_d$ is the transverse cross-sectional area of the gain region, and $A_{clad}$ is the entire transverse cross-sectional area within the inner cladding region 70.3 (e.g., $\pi D_{ic}^2/4$ for an inner cladding region having a circular cross-section). In turn, material absorption is given by $$\alpha_d = N_d \sigma_d, \quad (2)$$

where $N_d$ is the volume concentration of gain-producing species in the gain region, and $\sigma_d$ is the absorption cross-section of the dopants in the gain region matrix (e.g., crystal or glass) at the pump light wavelength.

The ability to increase cladding absorption of pump light would be advantageous. In fiber optic lasers and amplifiers, for a given output power, increased pump light absorption implies increased gain, which, in turn, means that the desired output power can be achieved with shorter fiber lengths in amplifiers and shorter cavity resonator lengths in lasers. Shorter fiber lengths, in turn, reduce the onset of nonlinear effects such as stimulated Raman scattering (SRS) and may be beneficial to improving fiber laser power stability and long term reliability.

Equations (1) and (2) would seem to suggest that cladding absorption could be increased by simply increasing $N_d$, the concentration of gain-producing species in the core region 70.1, or more precisely in the doped region $A_d$, of the fiber. However, for certain commercially important rare-earth species (Yb in particular) pump-light-induced photodarkening limits the concentration of the gain-producing species, thereby limiting the cladding absorption that can be achieved by simply increasing concentration.

An alternative approach to increasing cladding absorption would be to simply increase the area of the gain region; e.g., increase the diameter of the core region. However, when the diameter of the core region is increased too much, the capability of the fiber to remain operating in a single signal mode is adversely affected; that is, higher-order signal modes (HOMs) are allowed to propagate. The excitation of HOMs can create power instabilities that are highly undesirable and may damage the architecture of a fiber laser or amplifier. This constraint on the size of the core region also serves to limit undesirably the achievable mode-field diameter (MFD) of conventional DCFs.

Thus, there is a need to achieve increased cladding absorption in a double-clad, GPF while maintaining single-mode operation and without requiring increased concentration of the fiber's gain-producing species within the gain region.

There is also a need for a double-clad, GPF capable of supporting a MFD as large as approximately 16 µm.

BRIEF SUMMARY OF THE INVENTION

In accordance with one aspect of the invention, a double-clad GPF having an increased cladding absorption is presented without having to increase the concentration of the gain-producing species in the gain region. The design allows for the diameter of the core region to be increased while maintaining MFD and single-mode operation. Single mode operation means the fiber supports only a single signal mode (preferably the fundamental mode) or a few signal modes (preferably the fundamental mode plus no more than about 1-4 HOMs). Preferably the fiber operates in only the fundamental mode.

Thus, in accordance with one embodiment of the invention, the GPF comprises: a core region having a longitudinal axis and a cladding region surrounding the core region. The core and cladding regions are configured to support and guide the propagation of signal light in the fundamental transverse mode (predominantly) in the core region in the direction of the axis. The cladding region includes a trench region surrounding the core region, an inner cladding region surrounding the trench region, and an outer cladding region surrounding the inner cladding region. The outer cladding region has a refractive index below that of the inner cladding region, the inner cladding region has a refractive index between that of the outer cladding region and the core region, and the trench region has a refractive index below that of the inner cladding region. At least the core region includes at least one gain-producing species that provides gain to the signal light when suitable pumping energy is applied to the fiber; e.g., when multimode pump light is coupled (launched) into the core region via (through) the inner cladding region. The core and cladding regions are configured so that the fundamental mode is guided predominantly in the core region and so that the absolute value of the difference in refractive index between the trench region and the inner cladding region is less than the difference in refractive index between the core region and the inner cladding region. This condition has proved to be valid for a multitude of GPF designs that employ Yb-doped core regions, Tm-doped core regions, and some designs with Er-doped core regions (in particular those in which the ratio of the core radius to the MFD is less than approximately 0.6).

On the other hand, in other GPF embodiments that employ an Er-doped core region, the core and cladding regions are again configured so that the fundamental mode is guided predominantly in the core region and so that the absolute value of the difference in refractive index between the trench region and the inner cladding region is greater than the difference in refractive index between the core region and the inner cladding region. In these embodiments, the ratio of the core radius to the MFD is greater than approximately 0.6.

Calculations of some embodiments of the invention demonstrate single-mode, GPF designs having increased cladding absorption (e.g., by greater than approximately 30%). The calculations also indicate that some embodiments of such GPF designs can, for a given cladding absorption, decrease the optical loss induced by photodarkening.

In addition, other calculations show that some embodiments of such GPF designs can operate in a single mode without suffering increased bend loss.

In accordance with another aspect of the invention, a method for increasing the cladding absorption of a double-clad, gain-producing fiber includes the steps of: (a) forming a trench region between the core and inner cladding regions; (b) configuring the core, trench and inner cladding regions so that (i) the refractive index of the trench region is less than that of the inner cladding region and (ii) in absolute value, the difference in refractive index between the trench and inner cladding regions is less than the difference in refractive index between the core and inner cladding regions; and (c) configuring the core, trench and inner cladding regions to support and guide the fundamental mode of signal light predominantly in the core region, and further, to allow coupling (launching) of multimode pump light into the core region via (through) the inner cladding region.

BRIEF DESCRIPTION OF THE SEVERAL VIEWS OF THE DRAWING

The invention, together with its various features and advantages, can be readily understood from the following more detailed description taken in conjunction with the accompanying drawing, in which:

FIG. 3 shows index profiles in the first and fourth quadrants only, it being understood that the corresponding profiles of the second and third quadrants are mirror images of those in the first and fourth quadrants, respectively. Note, the index dip 34 is an artifact of the specific process that might be used to fabricate the fiber; that is, a burnoff effect caused by the partial vaporization of core region co-dopants such as, but not limited to, $GeO_2$ or $P_2O_5$.

Various ones of the foregoing figures are shown schematically in that they are not drawn to scale and/or, in the interests of simplicity and clarity of illustration, do not include all of the details of an actual optical fiber or product depicted.

GLOSSARY

Bending: Macro-bending, commonly referred to as simply bending, takes place when a fiber is bent, coiled or curled so that its curvature is relatively constant along at least a portion of its length. In contrast, micro-bending takes place when curvature changes significantly within the adiabatic length scale for a particular fiber (e.g., along fiber lengths on the order of a millimeter or less). Such micro-bends are formed, for example, in standard micro-bending tests by pressing the fiber into sandpaper.

Center Wavelength: Throughout this discussion references made to wavelength are intended to mean the center wavelength of a particular light emission, it being understood that all such emissions have a characteristic linewidth that includes a well-known range of wavelengths above and below the center wavelength.

Glass Fiber: Optical fiber of the type described herein is typically made of glass (e.g., silica) in which the refractive indices of the core region and of the cladding region are controlled by the amount and type of one or more dopants (e.g., P, Al, Ge, F, Cl) or by hollow voids incorporated therein during the fabrication of the fiber, as is well known in the art. These refractive indices, as well as the thicknesses/diameters of core/cladding regions, determine important operating parameters, as is well known in the art. In order for such glass fibers to produce gain when suitably pumped, they are also doped with one or more gain-producing species [a rare-earth species (e.g., Er, Yb, Tm, Dy, Ho, etc.) or non-rare-earth elements (e.g., Bi, Cr)].

Index: The terms index and indices shall mean refractive index and refractive indices. In designs where a particular region (e.g., a cladding region) includes microstructure [e.g., holes, whether filled (e.g., with a low-index gas, liquid or solid) or unfilled (e.g., air-holes)], then the index of such a region is intended to mean the average index seen by light propagating in that region.

Figure 2:
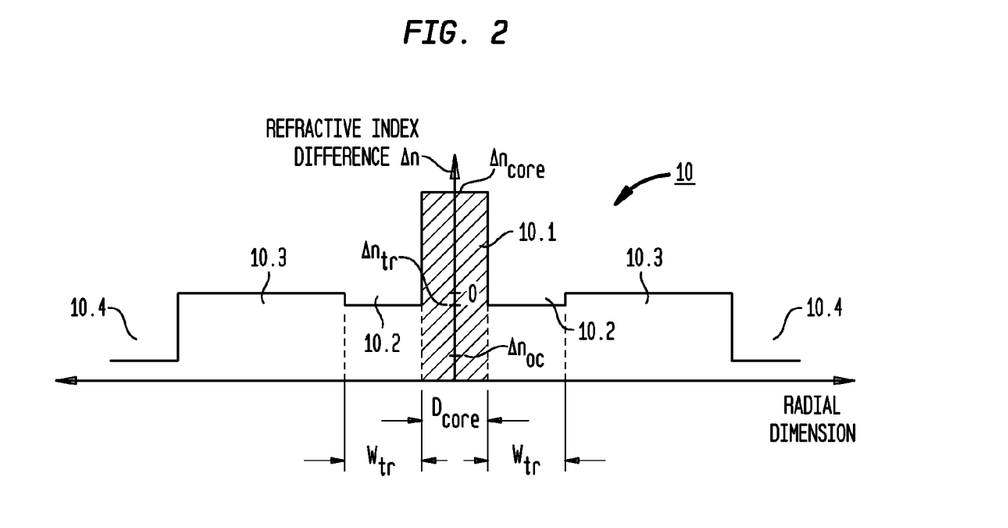
FIG. 2 is a schematic, illustrative refractive index profile of the GPF of FIG. 1.
Figure 3:
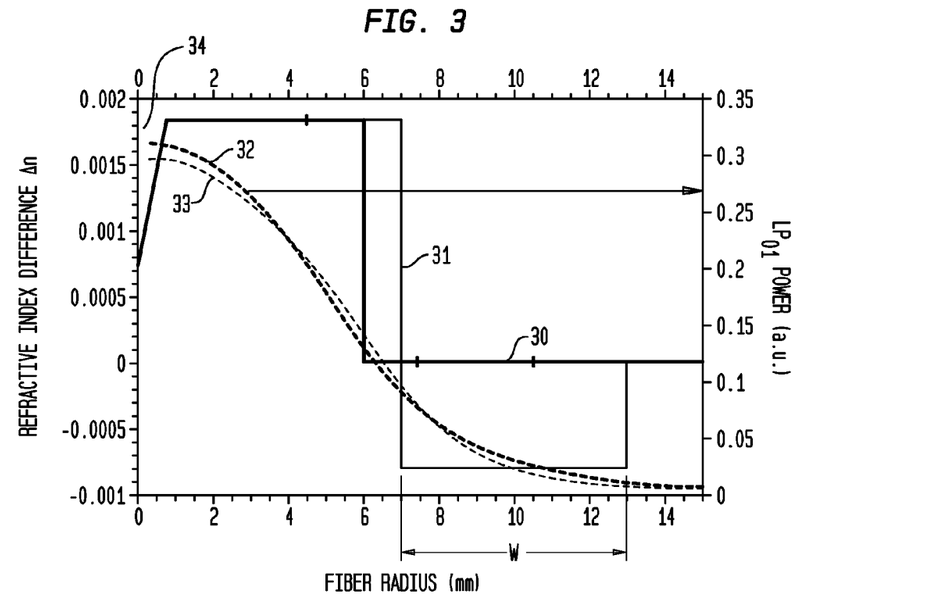
FIG. 3 shows a graph 30 of the refractive index profile of a step-index-core (SIC) fiber in accordance with a conventional design and a graph 31 of the refractive index profile of a GPF with a trench region in accordance with an illustrative embodiment of the invention. (Both of the fibers depicted in FIG. 3 are double-clad GPFs, but, for simplicity, the outer cladding region is not shown.) Graphs 32 and 33 of FIG. 3 also show the calculated fundamental mode power for the SIC fiber and the GPF, respectively. As compared to FIG. 2.

Index Profile: The schematic index profiles of FIGS. 2-3 depict averages of the actual minute variations of index that would be observable in an optical fiber. In addition, although various regions of the index profile may be shown as being rectangular, the boundaries of such regions need not be horizontal or vertical; one or more may be slanted, for example, the region may be trapezoidal or triangular.

LMA: In high-power applications, a large mode area (LMA) fiber is defined as having a fundamental mode effective area greater than or approximately equal to $90\lambda^2$, where $\lambda$ is the signal wavelength. For example, at a wavelength of 1060 nm (1.06 µm), an effective area around 100 µm² or greater constitutes a large mode area, whereas at a wavelength of at 1550 nm (1.55 µm) an effective area of 216 µm² or greater constitutes a large mode area.

$M^2$: The optical characteristics of a LMA fiber are sensitive to the details of its transverse refractive index profile. Conventional wisdom dictates that desirable LMA fibers have a fundamental mode with $M^2$ very near to 1.0, meaning that the optical field of the fundamental transverse mode is very nearly Gaussian in shape under the assumption that the transverse refractive index profile inside the core region is essentially uniform; that is, the refractive index profile is essentially uniform within the transverse cross-section of the core region. $M^2$ measures the similarity between the mode field and a true Gaussian function. More specifically, $M^2=1.0$ for a mode having a Gaussian shape, and $M^2>1.0$ for all other mode field shapes.

$M^2$ defines the similarity that the fundamental transverse mode of the fiber has to an ideal Gaussian function, as described by P. A. Belanger, *Optical Engineering*, Vol. 32, No. 9, pp. 2107-2109 (1993), which is incorporated herein by reference. (Although this paper defines $M^2$ for $LP_{01}$ fundamental mode of a step-index optical fiber, the definition is valid for all optical fibers described herein.) In theory $M^2$ may be arbitrarily large, but in practice $M^2$ for GPFs is typically in the range, $1<M^2<10$, approximately. Moreover, $M^2 \sim 1.06$ is typically considered to be small in the sense of $M^2 \sim 1.0$, for example, whereas $M^2 \sim 1.3$ is considered to be large in the sense of $M^2 \gg 1.0$, for example.

When $M^2$ is very near to 1.0 the beam emerging from the fiber may be efficiently collimated or tightly focused to a diffraction limited spot.

Thus, $M^2$ is a well known measure of what is typically referred to as beam quality.

Mode: The term mode(s) shall mean the transverse mode(s) of an electromagnetic wave (e.g., signal light, which includes signal light to be amplified in the case of an optical amplifier or the stimulated emission in the case of a laser).

Mode size: The size of an optical mode is characterized by its effective area $A_{eff}$, which is given by:

$$A_{eff} = \frac{\left(\int |E|^2 dA\right)^2}{\int |E|^4 dA}$$

where E is the transverse spatial envelope of the mode's electric field, and the integrations are understood to be performed over the transverse cross-sectional area of the fiber. When the mode-field shape is close to an axisymmetric (i.e., symmetric about the longitudinal axis of rotation of the fiber) Gaussian function, the mode-field diameter (MFD) is an appropriate metric for the diameter of the mode and may be expressed as:

$$MFD = 2\sqrt{\frac{2\int |E|^2 dA}{\int \left|\frac{dE}{dr}\right|^2 dA}}$$

where r is the radial coordinate. When the mode-field shape is exactly equal to an axisymmetric Gaussian function, then $A_{eff} = \pi \times MFD^2/4$.

Photodarkening: Photodarkening is the reversible creation of absorbing color centers in optical fibers. For example, when a high Yb doped fiber is exposed to intense pump radiation, the signal degrades over time. This photodarkening is likely due to the formation of a color center in the glass and appears as a strong absorption at visible wavelengths, accompanied by a strong absorption around 975 nm. *Specialty Optical Fibers Handbook*, ed. Mendez and Moore, Ch. 7.2.3, "Rare Earth Fibers," DiGiovanni et al., Academic Press (2007), which is incorporated herein by reference.

Radius/Diameter: Although the use of the terms radius and diameter in the foregoing (and following) discussion implies that the transverse cross-sections of the various regions (e.g., core, trench, cladding) are circular and/or annular, in practice these regions may be non-circular; for example, they may be rectangular, elliptical, polygonal, irregular or other more complex shapes. Nevertheless, as is common in the art, we frequently use the terms radius and/or diameter for simplicity and clarity.

Signal Propagation: Although signal light may actually crisscross the longitudinal axis as it propagates along a fiber, it is well understood in the art that the general direction of propagation is fairly stated as being along that axis (e.g., axis 10.5 of FIG. 1).

Single Mode: References made to light propagation in a single transverse mode are intended to include propagation in essentially or effectively a single mode; that is, in a practical sense, perfect suppression of all other modes may not always be possible. However, single mode does imply that the intensity of such other modes is either small or insignificant for the intended application. Thus, by the term single mode fiber we mean a fiber that operates in only one mode (preferably the fundamental mode) or in a few modes [i.e., the fundamental mode and no more than approximately 1-4 higher order modes (HOMs)].

Suppressed HOM: The degree to which an HOM needs to be suppressed depends on the particular application. Total or complete suppression is not demanded by many applications, which implies that the continued presence of a relatively low intensity HOM may be tolerable. In many instances it may be sufficient to provide a high degree of attenuation of HOMs compared to attenuation in the fundamental mode. We call this suppression relative or selective. In any event, suppressing HOMs improves system performance by, for example, improving beam quality, reducing total insertion loss, lowering noise in the signal mode, and lowering microbend loss.

Transverse Cross-Section: The phrase transverse cross-section means a cross-section of fiber in a plane perpendicular to the longitudinal axis of the fiber.

Undoped: The term undoped or unintentionally doped means that a region of a fiber, or a starting tube used to form such a region, contains a dopant not intentionally added to or controlled in the region during fabrication, but the term does not exclude low levels of background doping that may be inherently incorporated during the fabrication process.

DETAILED DESCRIPTION OF THE INVENTION

Double-Clad, Gain-Producing Fiber Design

Embodiments of the present invention depict a double-clad, gain-producing fiber (GPF) design having an increased cladding absorption without having to increase the concentration of the gain-producing species/dopant. Specifically, the fiber design includes a trench region that allows for the core diameter to be increased, which consequently increases the cladding absorption, as shown by equation (1); i.e., $\alpha_{clad} = \alpha_d [A_d/A_{clad}]$. For single-mode operation the core contrast $\Delta n_{core}$ should be less than approximately $8 \times 10^{-3}$. (Note, $\Delta n_{core} > 8 \times 10^{-3}$ implies that the core region diameter would have a commensurately smaller diameter in order to retain single-mode operation and, therefore, the cladding absorption would also be lower.)

In contrast, conventional wisdom is to use a LMA fiber with $\Delta n_{core} \sim 2.0$-$2.2 \times 10^{-3}$ (to attain a $LP_{11}$ cutoff at about 1030 nm) and MFD≈11 μm at an operating wavelength of about 1080 nm. However, the scope of the present invention encompasses not only LMA fibers with MFD as high as 16 μm approximately, but also fibers having a lower MFD, for example, 6 μm.

Figure 1:
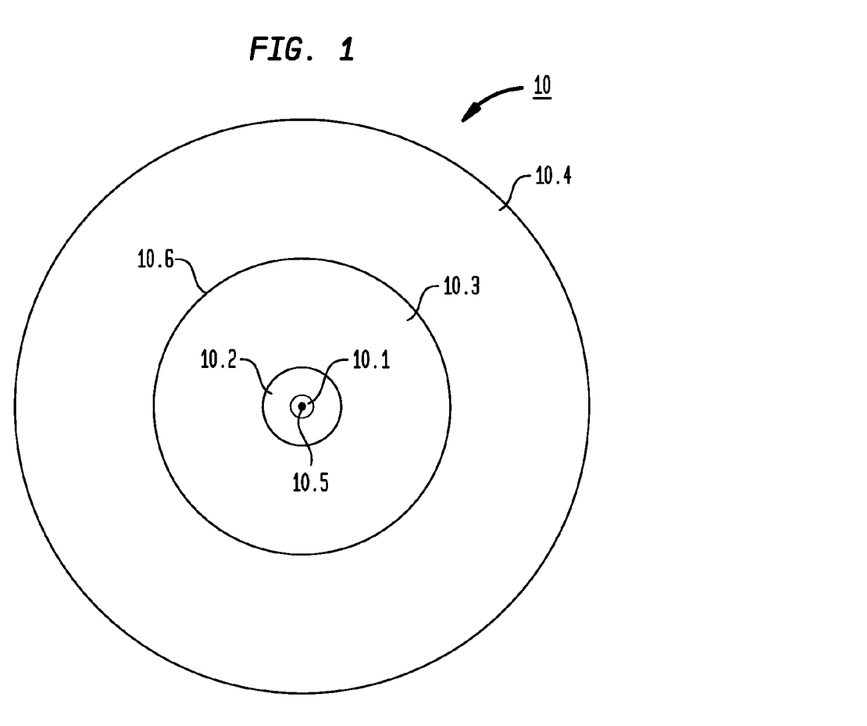
FIG. 1 is a schematic, transverse cross-section of a double-clad GPF in accordance with an illustrative embodiment of the invention.

Turning now to the drawings, FIG. 1 depicts a double-clad GPF 10 in accordance with an illustrative embodiment of the invention. GPF 10 comprises a core region 10.1 having a longitudinal axis 10.5 and a cladding region comprising regions 10.2, 10.3, and 10.4 surrounding the core region 10.1. The core and cladding regions are configured to support and guide the propagation of signal light in a fundamental transverse mode predominantly in the core region in the direction of the axis 10.5. In addition, the cladding region is configured to support and guide the propagation of multimode pump light.

The cladding region includes a trench region 10.2 surrounding the core region 10.1, an inner cladding region 10.3 surrounding the trench region 10.2, and an outer cladding region 10.4 surrounding the inner cladding region 10.3.

The outer perimeter 10.6 of the inner cladding region 10.3 is depicted as being circular for simplicity of illustration only. In practice, it is well known that this boundary is typically non-circular to inhibit the formation of helical modes of pump light and to increase the overlap of all pump modes with the core region.

As shown in FIG. 2, various refractive index differences Δn are defined relative to the index of inner cladding region 10.3, which accordingly is labeled zero. Thus, the outer cladding region 10.4 has a refractive index $\Delta n_{oc}$ below that of the inner cladding region 10.3, the inner cladding region 10.3 has a refractive index between that of the outer cladding region 10.4 and that of the core region 10.1 ($\Delta n_{core}$), and the trench region 10.2 has a refractive index $\Delta n_{tr}$ below that of the inner cladding region 10.3.

At least the core region 10.1 includes at least one gain-producing species that provides gain to the signal light when suitable pumping energy is applied to the fiber; i.e., coupled into the core region 10.1 via (through) the inner cladding region 10.3. Pump light propagates in a multimode fashion within the inner cladding, crisscrossing the core region (and being absorbed by the gain-producing species) as it does.

Pump light may be coupled (launched) into the fiber 10 using a variety of techniques/devices well known in the optical fiber art. Typically these techniques couple pump light into the core region 10.1 via (through) the inner cladding region 10.3 and trench region 10.2. Illustratively, a tapered fiber bundle (TFB) coupler may be used. The TFB coupler is typically of the type described by DiGiovanni & Stentz in U.S. Pat. No. 5,864,644 (1999), which is incorporated herein by reference. Alternatively, an evanescent coupler may be used in which a pump fiber and a GPF are disposed in contact with one another along the entire length of the GPF. The pump fiber and GPF may be arranged parallel to one another or twisted around one another as described by Grudinin et al. in U.S. Pat. No. 6,826,335 (2004), which is also incorporated herein by reference.

The core region 10.1 and cladding regions 10.2, 10.3, 10.4 are configured so that the fundamental mode is guided predominantly in the core region (i.e., the tails of the fundamental mode extend outside the core region and into the trench region 10.2). To this end, the inventive fiber design, including especially the trench region 10.2, allows the diameter of the core region to be increased without introducing a significant number of HOMs. As previously defined, the inventive design is considered to achieve single mode operation as long as the fundamental mode and no more than about 1-4 HOMs are supported.

As discussed in greater detail below, calculations of some embodiments of the invention demonstrate that the inventive GPF designs have an increased cladding absorption rate (e.g., by greater than approximately 30%). Calculations also indicate that some embodiments of such GPF designs have lower optical loss induced by photodarkening.

Illustratively, GPF 10 is fabricated of silica, with the core region 10.1 being doped with Yb as a gain-producing species and being co-doped with, for example, Ge, Al and P. The trench region 10.2 is doped with an index-reducing species, such as, for example, F or any dopant or combination of dopants that lower the index of the trench region below that of the core region. The inner cladding region 10.3 may be undoped, and the outer cladding region 10.4 is typically selected from the group consisting of a low-index polymer, down-doped silica, or an air clad structure of the type described by DiGiovanni & Windeler in U.S. Pat. No. 5,907,652 (1999), which is incorporated herein by reference.

The outer cladding region 10.4 illustratively has an NA of at least 0.22.

Alternatively, the inner cladding region may be doped with index-raising dopants, such as Al or Ge, in which case the indices of core region 10.1 and trench region 10.2 will be shifted upward while maintaining similar index differences with inner cladding region 10.3. Similarly, the inner cladding can be down-doped with index-decreasing dopants, such as F or B, with commensurate changes in the other indices.

Alternative GPF Design

In an alternative embodiment depicted in FIG. 2, the shaded area indicates that the gain-producing species is located only in the core region 10.1, where most of the energy of the fundamental mode of the signal light is confined. However, the tails of this mode extend into the trench region 10.2. But, since the trench region contains no gain-producing species, the tails experience no amplification, thereby reducing the efficiency of the amplifier or laser in which the GPF is incorporated. [One manifestation of such inefficiency is the generation of amplified spontaneous emission (ASE).] To alleviate this effect, a portion of the trench region 10.2 adjacent the core region 10.1 (i.e., the portion into which the tails extend) may also be doped with gain-producing species.

Method of Increasing Cladding Absorption

It is apparent from the foregoing description of the optical fiber design of FIGS. 1 & 2 that another aspect of the invention is a method of increasing the cladding absorption of a double-clad, GPF while maintaining single-mode operation, the method including the steps of: (a) forming a core region 10.1 with a core diameter ($D_{core}$) greater than that of a corresponding double-clad GPF without a trench region; (b) forming a trench region 10.2 between the core region 10.1 and the inner cladding region 10.3; (c) configuring the core, trench and inner cladding regions 10.1, 10.2, 10.3 so that (i) the refractive index of the trench region is less than that of the inner cladding region 10.3 and (ii) the difference in refractive index $\Delta n_{tr}$ between the trench and inner cladding regions 10.2, 10.3 is, in absolute value, less than the difference in refractive index $\Delta n_{core}$ between the core and inner cladding regions 10.1, 10.3; and (d) configuring the core, trench and inner cladding regions 10.1, 10.2, 10.3 so that the fundamental mode of signal light can be supported and guided predominantly in the core region 10.1 and so that multimode pump light can be coupled into the core region 10.1 via (through) the inner cladding region 10.3.

Calculated GPF Designs

A provided example of an inventive embodiment describes the design of double-clad, GPFs of the type shown in FIGS. 1-3. Performance and design calculations for this particular embodiment assume that the core region is doped with the gain-producing species Yb and co-doped with Ge, Al and P, the trench region 10.2 is down-doped with F, and the inner cladding region is undoped. However, the calculations are not dependent on the material used to form the outer cladding region 10.4 as long as the outer cladding region has a lower index than the inner cladding region.

Various materials, dimensions and operating conditions are provided by way of illustration only and, unless otherwise expressly stated, are not intended to limit the scope of the invention.

More specifically, the refractive index profile of this example of the inventive double-clad GPF 10 is shown by curve 31 of FIG. 3, and is juxtaposed with the index profile of a standard double-clad GPF as shown by curve 30 of FIG. 3. An example of how the core diameter can be increased in the inventive GPF design by including the trench region for a given MFD at a given wavelength (e.g., 1080 nm) compared to a standard double-clad GPF is given in Table I below:

TABLE I

| DCF | core region | | trench region | |
|---|---|---|---|---|
| | $\Delta n_{core}$ ($\times 10^{-3}$) | $D_{core}$ (μm) | $\Delta n_{tr}$ ($\times 10^{-3}$) | $W_{tr}$ (μm) |
| Standard | 1.8 | 11.8 | none | none |
| Invention | 1.8 | 14.0 | −0.8 | 7.0 |

The index contrast of the core and trench regions is by definition relative to the index of the inner cladding region. In both cases the core region was assumed to be doped with Yb and co-doped with oxides of Ge, Al, P and a fluoride of silicon such that Yb provided at least 65% of the total index contrast; for example, Yb (1-2 mole %), $GeO_2$ (<0.5 mole %), $Al_2O_3$ (3.5 mole %) and $P_2O_5$ (<0.5 mole %) and $SiF_4$ (1 mole %). In both cases, the inner cladding region was assumed to be undoped. In the case of the inventive GPF, the trench region was assumed to be down-doped with F. But any combinations of dopants (Ge, Al, P, F, B) may be suitable as long as the refractive index differences across the fiber cross-section are configured as previously described.

Both the standard and inventive GPFs above had the same core NA (0.08), the same material absorption of pump light (at a wavelength of approximately 915 nm), and the same HOM ($LP_{11}$) cutoff at a wavelength of approximately 1030 nm.

Figure 4:
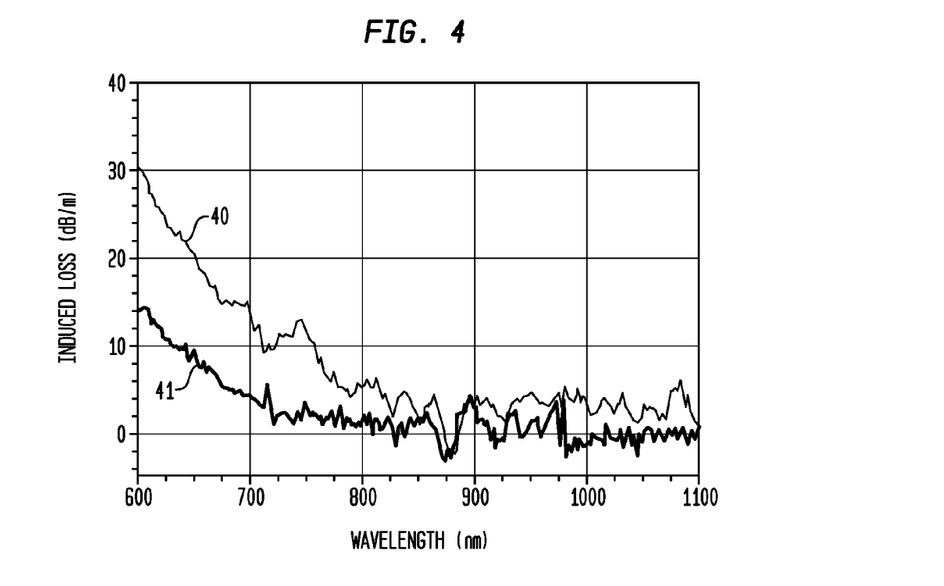
FIG. 4 shows graphs that depict photodarkening; that is, optical (signal) loss induced by absorption of pump light at pump light wavelengths ranging from 600 nm to 1100 nm. The results for a standard SIC fiber (index profile 30 of FIG. 3) are shown by curve 40, whereas the results for a GPF of the invention (profile 31 of FIG. 3) are shown by curve 41.

The inventive GPF has many optical characteristics that compare favorably with the standard DCF; namely, calculations indicate that some embodiments exhibit a lower rate of photodarkening (i.e., when the cladding absorption is the same in both the standard and inventive DCFs, then the larger $D_{core}$ allowed by the trench region allows lower material absorption, which results in lower photodarkening) whereas others exhibit increased cladding absorption (i.e., when the material absorption is the same in both the standard and inventive DCFs, then the larger $D_{core}$ allowed by the trench region causes higher cladding absorption but not lower photodarkening). Thus, some embodiments of the inventive GPF designs can, for a given cladding absorption, decrease the level of photodarkening observed with some gain-producing species (e.g., Yb) as the volume concentrations of such gain-producing species $N_d$ required to achieve a given $\alpha_{clad}$ is decreased. A lower rate of photodarkening provides output increased efficiency and output power, and, in the case of a cladding-pumped fiber laser (e.g., FIG. 6), increased reliability with a larger end-of-life margin for the pump laser. Details of the optical loss induced by photodarkening over a wavelength range extending from 600 nm to 1100 nm are shown in FIG. 4. Curve 40 indicates the photodarkening-induced loss for a standard GPF (index profile shown by curve 30 of FIG. 3), whereas curve 41 indicates the corresponding lower loss at all wavelengths for the inventive GPF (index profile shown by curve 31 of FIG. 3).

On the other hand, increased cladding absorption provides increased SRS threshold, which allows for increased output power. It also provides a reduced design footprint (GPF length), which facilitates packaging. In this illustration, the cladding absorption was increased by more than 30%, from approximately 0.88 dB/m in the standard GPF to approximately 1.2 dB/m in the inventive GPF.

As described earlier, a particularly attractive feature of the inventive GPF resides in the larger core diameter that can be used while still maintaining the ability to achieve single-mode operation. In the illustration of Table I, the core diameter was about 11.8 μm in the standard GPF and about 14.0 μm in the inventive GPF, approximately a 2.2 μm increase. In a cladding-pumped fiber laser (e.g., FIG. 6), the larger core implies an increased cladding absorption (e.g., by 36%) and hence a shorter laser (e.g., a 36% shorter double-clad GPF), which is easier to package.

The larger core size also increases the overlap between the signal light fundamental mode and the gain region (i.e., the core region 10.1 for the inventive GPF). Consequently, the efficiency of energy transfer to the signal light is enhanced. This feature is demonstrated by comparing the overlap between $LP_{01}$ power curve 33 (FIG. 3) for the fundamental signal mode in the inventive GPF having the index profile of curve 31, as contrasted with $LP_{01}$ power curve 32 for the fundamental signal mode in the conventional SIC GPF having the index profile of curve 30.

Various designs of inventive ytterbium (Yb)-doped GPFs (DCFs with trench region) are indicated in Table II below, where they are compared with designs of standard Yb-doped GPFs (DCFs without trench regions, as indicated by the abbreviation N/A in the trench width column). Table II indicates the MFD at a wavelength of 1080 nm as a function of various parameters of the core and trench regions; namely, the core radius ($R_{core}$), the core index contrast ($\Delta n_{core}$), the trench index contrast ($\Delta n_{tr}$), and the minimum trench width ($W_{tr}$) to maintain single-mode operation for the particular core radius.

For each inventive GPF of a particular MFD, Table II also indicates the resulting factor by which the core area is increased, and, therefore, the percent increase in the cladding absorption ($\alpha_{clad}$).

With respect to the inner and outer cladding regions of the designs listed in Table II, the index difference of the inner cladding region is zero since it is the designated reference, whereas the index difference of the outer cladding region (which guides the pump light) is at least $-15.5 \times 10^{-3}$. The thickness of the inner cladding region is at least 50 μm, whereas the thickness of the outer cladding region is at least 10 μm.

TABLE II (Yb-doped GPFs; operation at 1030-1180 nm; $LP_{11}$ cutoff at 1000-1060 nm)

| MFD (μm) | $R_{core}$ (μm) | $\Delta n_{core}$ (×10⁻³) | $\Delta n_{tr}$ (×10⁻³) | $W_{tr}$ (min) (μm) | $A_{core}$ increase factor ($\alpha_{clad}$ increase) |
|---|---|---|---|---|---|
| 6 | 2.75 | 7.80 | 0.00 | N/A | |
| | 2.95 | 7.80 | −0.50 | 2.25 | |
| | 3.05 | 7.80 | −1.00 | 3.00 | |
| | 3.20 | 7.80 | −2.00 | 4.00 | |
| | 3.30 | 7.80 | −3.00 | 5.00 | |
| | 3.40 | 7.80 | −4.00 | 6.00 | 1.53 (53%) |
| 7 | 3.15 | 5.65 | 0.00 | N/A | |
| | 3.50 | 5.65 | −1.00 | 2.00 | |
| | 3.85 | 5.65 | −2.00 | 3.00 | |
| | 4.00 | 5.65 | −3.00 | 5.00 | |
| | 4.10 | 5.65 | −4.00 | 7.00 | 1.69 (69%) |
| 8 | 3.65 | 4.30 | 0.00 | N/A | |
| | 3.90 | 4.30 | −0.50 | 1.75 | |
| | 4.10 | 4.30 | −1.00 | 1.50 | 1.26 (26%) |
| 10 | 4.50 | 2.80 | 0.00 | N/A | |
| | 5.10 | 2.80 | −0.50 | 3.50 | |
| | 5.40 | 2.80 | −1.00 | 3.50 | |
| | 5.65 | 2.80 | −1.50 | 3.50 | 1.58 (58%) |
| 12 | 5.50 | 2.00 | 0.00 | N/A | |
| | 5.95 | 2.00 | −0.25 | 3.50 | |
| | 6.10 | 2.00 | −0.35 | 4.50 | |
| | 6.30 | 2.00 | −0.50 | 5.00 | |
| | 6.50 | 2.00 | −0.65 | 7.00 | |
| | 6.70 | 2.00 | −0.80 | 10.00 | 1.48 (48%) |
| 14 | 6.35 | 1.50 | 0.00 | N/A | |
| | 6.70 | 1.50 | −0.15 | 2.50 | |
| | 6.90 | 1.50 | −0.25 | 4.50 | |
| | 7.10 | 1.50 | −0.45 | 5.00 | |
| | 7.50 | 1.50 | −0.60 | 7.50 | |
| | 7.90 | 1.50 | −0.80 | 10.00 | 1.55 (55%) |
| 16 | 7.45 | 1.10 | 0.00 | N/A | |
| | 8.70 | 1.10 | −0.35 | 8.00 | |
| | 8.70 | 1.10 | −0.40 | 8.00 | 1.36 (36%) |
| 18 | 8.50 | 0.80 | 0.00 | N/A | |
| | 11.00 | 0.80 | −0.25 | 9.00 | 1.67 (67%) |

In summary, Table II demonstrates that MFDs of approximately 6-18 μm (e.g., 6-16 μm) can be attained in Yb-doped inventive designs when the core and cladding regions are configured so that cladding absorption is increased by approximately 26-69%. In addition, when the MFD is approximately 6-8 μm, the radius of the core region is approximately 2.9-4.1 μm, the index contrast $\Delta n_{core}$ of the core region is approximately $4.3-7.8 \times 10^{-3}$, the index contrast $\Delta n_{tr}$ of the trench region is approximately $-0.5 \times 10^{-3}$ to $-4.0 \times 10^{-3}$, and the minimum width of the trench region is approximately 1.5-7.0 μm. On the other hand, when the MFD is approximately 10-18 μm (e.g., 10-16 μm), the radius of the core region is approximately 4.6-11.0 μm, the index contrast of the core region is approximately $0.8-2.8 \times 10^{-3}$, the index contrast of the trench region is approximately $-0.15 \times 10^{-3}$ to $-0.8 \times 10^{-3}$, and the minimum width of the trench region is approximately 2.5-10.0 μm.

In a similar fashion Tables III and IV, below, describe the corresponding parameters for comparing standard GPFs (DCFs without trench regions) with alternative inventive designs (DCFs with trench regions) wherein the core regions are doped with either erbium (Er; for operation at approximately 1530-1630 nm) or thulium (Tm; for operation at approximately 1940-2050 nm).

TABLE III (Er-doped GPFs; operation at 1530-1630 nm; $LP_{11}$ cutoff at 1470-1530 nm)

| MFD (μm) | $R_{core}$ (μm) | $\Delta n_{core}$ (×10⁻³) | $\Delta n_{tr}$ (×10⁻³) | $W_{tr}$ (min) (μm) | $A_{core}$ increase factor ($\alpha_{clad}$ increase) |
|---|---|---|---|---|---|
| 9 | 4.30 | 4.50 | 0.00 | N/A | |
| | 4.90 | 4.50 | −1.00 | 2.00 | |
| | 5.20 | 4.50 | −2.00 | 3.50 | |
| | 5.50 | 4.50 | −4.00 | 3.50 | |
| | 5.70 | 4.50 | −6.00 | 4.00 | 1.76 (76%) |
| 11 | 5.25 | 3.00 | 0.00 | N/A | |
| | 6.50 | 3.00 | −2.00 | 3.00 | |
| | 6.90 | 3.00 | −4.00 | 3.50 | |
| | 7.25 | 3.00 | −6.00 | 4.00 | 1.91 (91%) |
| 14 | 6.50 | 2.00 | 0.00 | N/A | |
| | 8.25 | 2.00 | −2.00 | 2.50 | |
| | 8.75 | 2.00 | −4.00 | 3.00 | |
| | 9.00 | 2.00 | −6.00 | 4.00 | 1.92 (92%) |
| 16 | 8.00 | 1.50 | 0.00 | N/A | |
| | 9.25 | 1.50 | −1.00 | 4.75 | |
| | 9.75 | 1.50 | −2.00 | 5.00 | |
| | 10.50 | 1.50 | −4.00 | 6.00 | 1.81 (81%) |
| 20 | 9.25 | 1.00 | 0.00 | N/A | |
| | 11.75 | 1.00 | −1.00 | 5.00 | |
| | 12.50 | 1.00 | −2.00 | 6.00 | |
| | 13.0 | 1.00 | −4.00 | 8.00 | 1.98 (98%) |

In summary, Table III demonstrates that MFDs of approximately 9-20 μm can be attained in Er-doped inventive designs when the core and cladding regions are configured so that cladding absorption is increased by approximately 76-98%. In addition, when the MFD is approximately 9-20 μm, the radius of the core region is approximately 4.3-13.0 μm, the index contrast $\Delta n_{core}$ of the core region is approximately $1.0-4.5 \times 10^{-3}$, the index contrast $\Delta n_{tr}$ of the trench region is approximately $-1.0 \times 10^{-3}$ to $-6.0 \times 10^{-3}$, and the minimum width of the trench region is approximately 2.0-8.0 μm.

An interesting feature of the Er-doped designs is the relative values of $\Delta n_{core}$ and $\Delta n_{tr}$, that is, in some Er-doped designs the absolute value of $\Delta n_{tr}$ can be larger than the absolute value of $\Delta n_{core}$. More specifically, this condition has proved to be valid for a subset of designs of Er-doped core regions wherein the ratio $R_{core}/MFD \geq 0.6$ approximately.

A theoretical explanation for the behavior of Er-doped GPFs above and below $R_{core}/MFD \geq 0.6$ approximately is not currently available. However, from a practical stand point (i.e., ease of fabrication and/or ease of utilization), it is preferable for the inventive GPF to have a trench with a relatively shallow depth. Indeed the deeper the trench, the more difficult it is to splice the GPF because trenches are commonly fabricated by addition of fluorine, which diffuses quickly during typical heat-driven splice operations.

In contrast, in all of the Yb-doped designs in Table I and all of the Tm-doped designs in Table III the opposite is true; that is, in absolute value $\Delta n_{tr} < \Delta n_{core}$.

TABLE IV (Tm-doped GPFs; operation at 1940-2050 nm; $LP_{11}$ cutoff at 1880-1940 nm)

| MFD (μm) | $R_{core}$ (μm) | $\Delta n_{core}$ (×10⁻³) | $\Delta n_{tr}$ (×10⁻³) | $W_{tr}$ (min) (μm) | $A_{core}$ increase factor ($\alpha_{clad}$ increase) |
|---|---|---|---|---|---|
| 8 | 3.50 | 16.00 | 0.00 | N/A | |
|  | 3.85 | 16.00 | −3.00 | 3.00 | |
|  | 4.25 | 16.00 | −7.00 | 6.00 | 1.47 (47%) |
| 10 | 4.85 | 8.50 | 0.00 | N/A | |
|  | 5.50 | 8.50 | −2.00 | 4.00 | |
|  | 6.00 | 8.50 | −5.00 | 4.50 | 1.53 (53%) |
| 14 | 6.25 | 5.00 | 0.00 | N/A | |
|  | 7.00 | 5.00 | −1.00 | 4.00 | |
|  | 7.50 | 5.00 | −2.00 | 6.00 | 1.44 (44%) |
| 20 | 9.25 | 2.35 | 0.00 | N/A | |
|  | 10.50 | 2.35 | −1.00 | 4.50 | |
|  | 11.00 | 2.35 | −2.00 | 4.50 | 1.41 (41%) |

In summary, Table IV demonstrates that MFDs of approximately 8-20 μm can be attained in Tm-doped inventive designs when the core and cladding regions are configured so that cladding absorption is increased by approximately 41-53%. In addition, when the MFD is approximately 8-20 μm, the radius of the core region is approximately 3.5-11.0 μm, the index contrast $\Delta n_{core}$ of the core region is approximately 2.35-16.0×10⁻³, the index contrast $\Delta n_{tr}$ of the trench region is approximately −1.0×10⁻³ to −7.0×10⁻³, and the minimum width of the trench region is approximately 3.0-6.0 μm.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention. In particular, the presence of the trench region reduces the bend sensitivity of the inventive GPF, which alleviates bend-induced effects when the fiber is coiled, for example, in an amplifier or laser package.

Applications: High Power Fiber Amplifiers and Lasers

Figure 5:
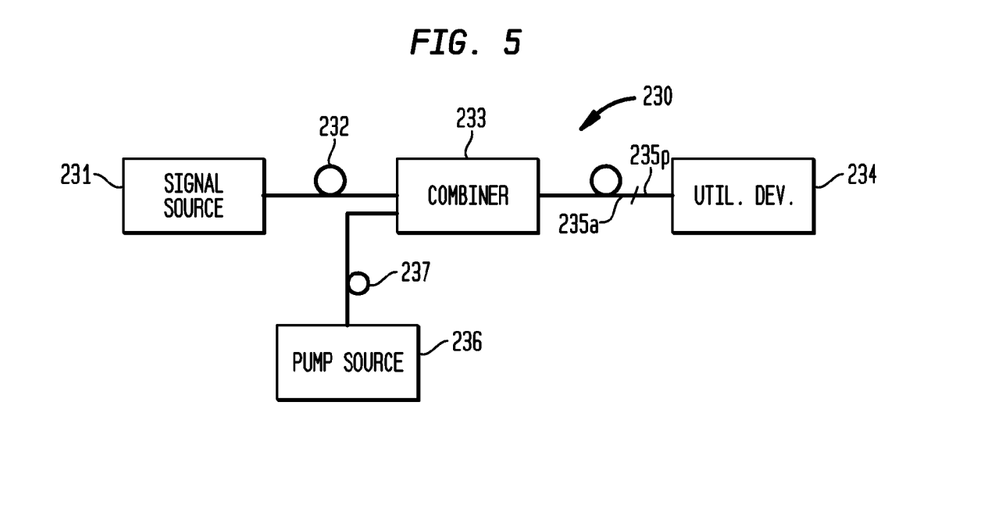
FIG. 5 is a schematic block diagram depicting an illustrative optical fiber amplifier employing a GPF in accordance with an illustrative embodiment of the invention.

One application of the invention is depicted in FIG. 5, a high power optical fiber amplifier 230 comprising a GPF 235a optically coupled to an optional pigtail fiber 235p. GPF 235a is optically coupled to a combiner 233, and pigtail fiber 235p is optically coupled to a utilization device 234. GPF 235a is designed in accordance with the invention, and along with pigtail 235p, is typically coiled inside the amplifier package. In a typical commercially available amplifier package, coiled GPF fiber 235a and pigtail 235p are mounted on a well-known plate or a mandrel (not shown).

In relatively high power applications, combiner 233 is known as a pump-combiner, which couples the outputs of an optical input signal source 231 and an optical pump source 236 into the GPF 235a. Pump combiner 233 may be formed by well-known bulk optic components, or as previously described, by a tapered fiber bundle of the type described by DiGiovanni & Stentz in U.S. Pat. No. 5,864,644 (1999), or by an evanescent coupler of the type described by Grudinin et al., in U.S. Pat. No. 6,826,335 (2004), both of which are incorporated herein by reference, or by other known methods. The input signal source 231 generates a first-wavelength optical input signal, which is coupled to an input of combiner 233 via a conventional fiber 232 or via bulk optic components (not shown), whereas the pump source 236 generates a second-wavelength optical pump signal, which is coupled by a conventional, typically multimode, fiber 237 to another input of combiner 233. (Combiner 233 ultimately couples signal light into the core region of GPF 235a and multimode pump light into the inner cladding region of GPF 235a, as previously described in conjunction with FIGS. 1-3.)

As is well known in the art, the pump signal generates a population inversion in the GPF 235a, which amplifies the input signal from input source 231. The amplified input signal propagates along GPF 235a (and through pigtail 235p, if present) to utilization device 234. In high power applications the latter may include myriad well known devices or apparatuses; e.g., another optical amplifier, a beam collimator, a lens system, a work piece on which cutting or welding operations are to be performed.

Illustratively, the input source 231 is a laser that generates a relatively low power optical input signal at a wavelength in the amplification range of the GPF 235a, whereas the pump source 236 is preferably a semiconductor laser, but optionally could be an array of semiconductor light emitting diodes (LEDs). In either case, pump source 236 generates a relatively high optical power (e.g., above about 150 mW or even above 100 W) pump signal at a shorter wavelength that produces the desired amplification of the input signal. In the preferred embodiment, when GPF 235a is doped with ytterbium, the signal source 231 generates an input signal having a wavelength of about 1080 nm, and the pump source 236 generates a pump signal at a wavelength of about 915 nm, or alternatively at about 975 nm.

Although the amplifier 230 of FIG. 5 depicts a common co-propagating pump configuration (i.e., the pump and input signals propagate in the same direction through the GPF), it is also possible to use a counter-propagating configuration (i.e., the pump and input signals propagate in opposite directions through the GPF). In addition, a multiplicity of amplifiers may be arranged in tandem, a scheme that is well known in the art for increasing the total gain of a high power multi-stage system. Pump energy may alternatively be transversely coupled into the amplifier.

When the amplifier apparatus is configured to operate as a laser, then signal source 231 is omitted and the signal light described above would be equivalent to the stimulated emission generated internally by the laser.

Figure 6:
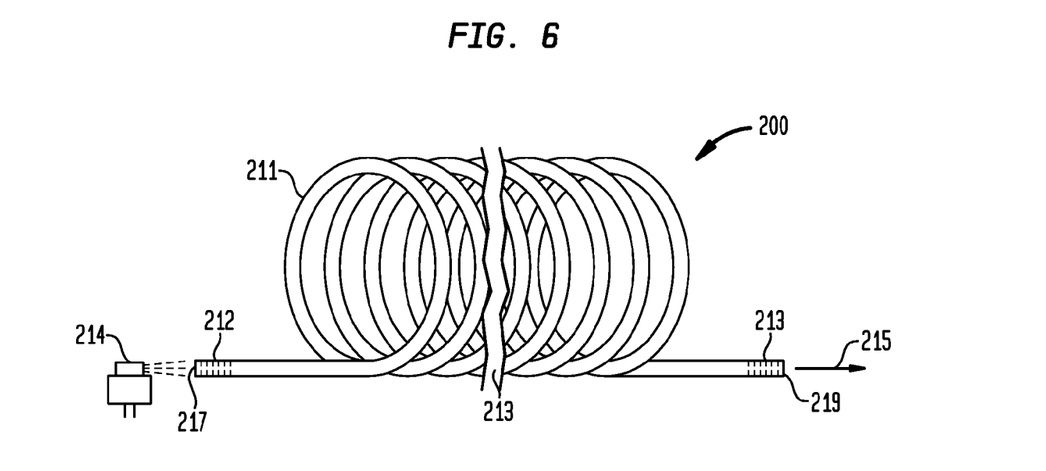
FIG. 6 is a schematic block diagram depicting an illustrative cladding-pumped optical fiber laser employing a GPF in accordance with an illustrative embodiment of the invention.

A schematic embodiment of such a laser 200 is shown in FIG. 6. Laser 200 is designed to provide a high power output 215. The basic design follows that illustrated by DiGiovanni in U.S. Pat. No. 5,937,134 (1999), which is also incorporated herein by reference. However, here the active medium of laser 200 comprises a coiled, single-mode, double-clad GPF fiber 211 designed in accordance with the invention, as discussed above with reference to FIGS. 1-3.

A portion of the coiled GPF 211 is shown to be cutaway at location 213 to depict substantial length. The length of fiber in such laser structures is typically of the order of a meter to tens of meters. Since the diameter of the coil is illustratively about 15 cm, the fiber 211 represents many turns. (Similar comments apply to the coiled amplifier GPF 235a of FIG. 5, and as with such amplifiers, the coiled GPF 211 of laser 200 is typically wound on a well-known plate or mandrel, not shown.)

The laser active medium is disposed within a cavity resonator formed by Bragg gratings 212 and 213 illustratively disposed at (or near) the ends 217, 219, respectively, of GPF 211. These gratings, or reflectors, are typically formed by photo-induced refractive index changes in the core region of the GPF 211.

The active medium is end-pumped by means of an optical pump source 214, which generates pump light that is coupled into the inner cladding region (not shown) at one end 217 of GPF 211. Although source 214 is shown to be separate from the end 217, it will be apparent to those skilled in the art that typically end 217 is attached to source 214 via a suitable coupler (not shown). Pump light from source 214 is absorbed in the core region of GPF 211 (i.e., by the gain-producing species therein), creates a population inversion, and generates a laser light output 215, which emerges from the opposite end 219 of GPF 211.

Typically pump source 214 comprises a semiconductor laser diode (or an array of such diodes). Illustratively, the active region of the laser diode comprises AlGaAs, which generates pump light at a wavelength of about 980 nm or comprises InGaAs or InGaAsP for generating pump light at longer wavelengths in the range of 1000-1600 nm. Alternatively, pump source 214 may comprise other types of solid state lasers, e.g., T-sapphire or Nd-glass, or can be a fiber laser.

What is claimed is:

1. A double-clad, gain-producing optical fiber comprising:
a core region having a longitudinal axis,
a cladding region surrounding said core region, said core and cladding regions configured to support and guide the propagation of signal light in a fundamental transverse mode in the direction of said axis,
said cladding region including a trench region surrounding said core region, an inner cladding region surrounding said trench region, and an outer cladding region surrounding said inner cladding region, said outer cladding region having a refractive index below that of said inner cladding region, said inner cladding region having a refractive index between that of said outer cladding region and said core region, and said trench region having a refractive index below that of said inner cladding region,
at least said core region including at least one gain-producing species that provides gain to said signal light when suitable pumping energy is applied to said fiber, and
said core and cladding regions being configured so that said fundamental mode is guided predominantly in said core region and the difference in refractive index $\Delta n_{tr}$ between said trench region and said inner cladding region is, in absolute value, less than the difference in refractive index $\Delta n_{core}$ between said core region and said inner cladding region, thereby allowing the diameter of said core region and the cladding absorption of said fiber both to be increased as compared to a corresponding gain-producing fiber without said trench region while maintaining single-mode operation of said signal light,
wherein said core, trench and inner cladding regions are configured to increase by at least approximately 30% the cladding absorption ($\alpha_{clad}$) of said fiber, where $\alpha_{clad} = \alpha_d (A_d/A_{clad})$, $\alpha_d$ is the absorption coefficient of the regions of said fiber that include gain-producing species, $A_d$ is the transverse cross-sectional area of the regions of said fiber that include gain-producing species, and $A_{clad}$ is the total transverse cross-sectional area of said fiber contained within said outer cladding, as compared to a fiber with similar MFD but without said trench region.

2. The fiber of claim 1, wherein at least said core region is doped with Yb, said fundamental mode is characterized by a mode-field diameter (MFD) of approximately 6-16 μm and said core and cladding regions are configured so that said cladding absorption is increased by approximately 26-69% as compared to a corresponding gain-producing fiber without said trench region.

3. The fiber of claim 2, wherein said MFD is approximately 6-8 μm, the radius of said core region is approximately 2.9-4.1 μm, the index contrast of said core region is approximately 4.3-7.8×10$^{-3}$, the index contrast of said trench region is approximately −0.5×10$^{-3}$ to −4.0×10$^{-3}$, and the minimum width of said trench region is approximately 1.5-7.0 μm.

4. The fiber of claim 2, wherein said MFD is approximately 10-16 μm, the radius of said core region is approximately 4.6-8.7 μm, the index contrast of said core region is approximately 1.1-2.8×10$^{-3}$, the index contrast of said trench region is approximately −0.15×10$^{-3}$ to −0.8×10$^{-3}$, and the minimum width of said trench region is approximately 2.5-10.0 μm.

5. The fiber of claim 1, wherein at least a portion of said trench region also includes at least one gain-producing species.

6. The fiber of claim 1, wherein said core, trench and inner cladding regions comprise silica and said outer cladding region is selected from the group consisting of a low-index polymer, down-doped silica, and an air clad structure.

7. The fiber of claim 1, wherein said core and cladding regions are configured to support and guide only said fundamental mode of said signal light.

8. The fiber of claim 1, wherein said core and cladding regions are configured to support and guide said fundamental mode and no more than about 1-4 modes of said signal light.

9. The fiber of claim 1, wherein said pumping energy is provided by a source of multimode pump light and said core and cladding regions are configured so that said pump light can be coupled into said core region via said inner cladding region.

10. A method of increasing the cladding absorption of a double-clad, gain-producing fiber that includes a gain-producing core region, an inner cladding region surrounding said core region and an outer cladding surrounding said inner cladding region, said method including the steps of
(a) forming a trench region between said core region and said inner cladding region; the diameter of said core region being greater than that of a corresponding double-clad, gain-producing fiber that does not have a trench region;
(b) configuring said core, trench and inner cladding regions so that (i) the refractive index of said trench region is less than that of said inner cladding region and (ii) the difference in refractive index $\Delta n_{tr}$ between said trench and inner cladding regions is less than the difference in refractive index $\Delta n_{core}$ between said core region and said inner cladding region; and
(c) configuring said core, trench and inner cladding regions so that the fundamental mode of signal light can be supported and guided in said core region and so that multimode pump light can be coupled into said core region via said inner cladding region,
wherein, steps (a), (b) and (c) configure said core, trench and inner cladding regions to increase by at least approximately 30% the cladding absorption ($\alpha_{clad}$) of said fiber, where $\alpha_{clad} = \alpha_d(A_d/A_{clad})$, $\alpha_d$ is the absorption coefficient of the regions of said fiber that include gain-producing species, $A_d$ is the transverse cross-sectional area of the regions of said fiber that include gain-producing species, and $A_{clad}$ is the total transverse cross-sectional area of said fiber, as compared to a fiber with similar MFD but without said trench region.

11. The method of claim 10, wherein steps (a), (b) and (c) configure said core, trench and cladding regions so that said fundamental mode is characterized by a mode-field diameter (MFD) of approximately 6-16 μm and said core and cladding regions are configured so that said cladding absorption is increased by approximately 26-69%.

12. The method of claim 11, wherein steps (a), (b) and (c) configure said core, trench and cladding regions so that said MFD is approximately 6-8 μm, the radius of said core region is approximately 2.9-4.1 μm, the index contrast of said core region is approximately $4.3\text{-}7.8\times10^{-3}$, the index contrast of said trench region is approximately $-0.5\times10^{-3}$ to $-4.0\times10^{-3}$, and the width of said trench region is approximately 1.5-7.0 μm.

13. The method of claim 11, wherein steps (a), (b) and (c) configure said core and cladding regions so that said MFD is approximately 10-16 μm, the radius of said core region is approximately 4.6-8.7 μm, the index contrast of said core region is approximately $1.1\text{-}2.8\times10^{-3}$, the index contrast of said trench region is approximately $-1.5\times10^{-3}$ to $-0.15\times10^{-3}$, and the minimum width of said trench region is approximately 2.5-10.0 μm.

14. The method of claim 10, wherein step (a) forms said trench region so that at least a portion of said trench region also includes at least one gain-producing species.

15. The method of claim 10, wherein steps (a), (b) and (c) configure said core, trench and inner cladding regions to comprise silica and said outer cladding region to be selected from the group consisting of a low-index polymer, down-doped silica, and an air clad structure.

16. The method of claim 10, wherein, steps (a), (b) and (c) configure said core, trench and inner cladding regions so that said fiber supports and guides only said fundamental mode of said signal light.

17. The method of claim 10, wherein, steps (a), (b) and (c) configure said core, trench and inner cladding regions so that said fiber supports and guides said fundamental mode and no more than about 1-4 modes of said signal light.

\* \* \* \* \*